April 15, 1930.  R. S. STEWART  1,754,373
ANNEALING POT
Filed Oct. 12, 1927
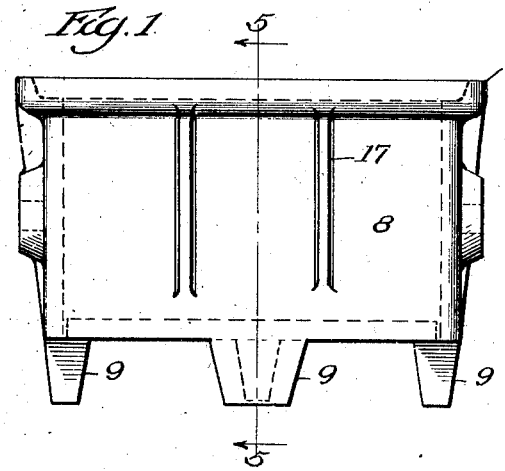
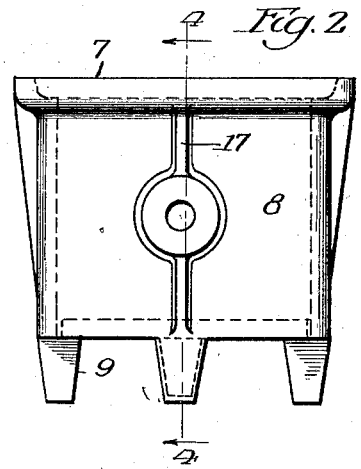
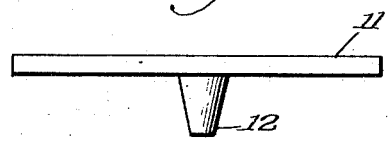
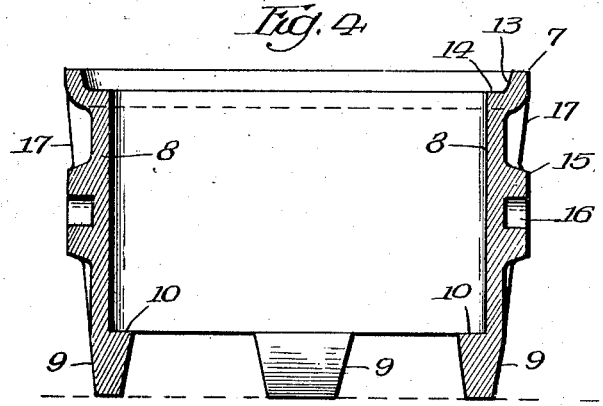
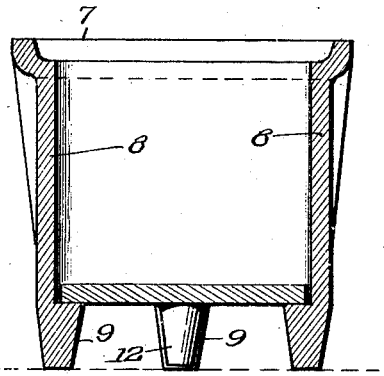
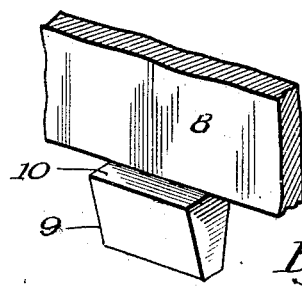

Patented Apr. 15, 1930

1,754,373

UNITED STATES PATENT OFFICE

ROBERT S. STEWART, OF CHICAGO, ILLINOIS, ASSIGNOR TO THE AMERICAN BRAKE SHOE & FOUNDRY COMPANY, OF NEW YORK, N. Y., A CORPORATION OF DELAWARE

ANNEALING POT

Application filed October 12, 1927. Serial No. 225,656.

This invention relates to open bottom annealing pots and it has for its object to dispense with the separate stool which has heretofore been used as a base or support for each pot and to space the pots when stacked one upon the other, and to provide integral means on each pot for supporting and spacing pots in a stack whereby to reduce the weight of each pot and the aggregate weight of a stack of pots, to reduce the number of parts and to simplify handling and stacking the pots, to reduce the height of a stack and provide additional annealing capacity or circulation space in the oven, to economize fuel consumption and to provide for more efficient circulation of heat.

With these and other ends in view the invention contemplates the provision of integral legs on the bottom of the walls of the pot to form a support for the pot and to space the pots in stacking, and a removable bottom for the pot with an integral centrally disposed leg to assist in supporting the bottom and the load carried thereby.

In the accompanying drawings I have illustrated the invention in a selected embodiment of an open bottom pot rectangular in shape and referring thereto, Fig. 1 is a side elevation and Fig. 2 is an end elevation of the pot.

Fig. 3 is a detail view of the bottom of the pot.

Fig. 4 is a longitudinal sectional view on the line 4—4 of Fig. 2 with the bottom removed.

Fig. 5 is a transverse sectional view on the line 5—5 of Fig. 1.

Fig. 6 is a detail enlarged view.

Referring to the drawings the pot 7 has walls 8 and is open at the bottom. A plurality of spaced integral legs 9 are provided on the bottom of the walls of the pot and these legs have shoulders 10 projecting inwardly beyond the inner faces of the walls to receive and support the removable bottom 11 which is provided with a centrally disposed integral leg 12. The shoulders are of substantial width to form a firm support for the bottom with its load and the bottom is made somewhat smaller in dimensions than the inside dimensions of the pot to facilitate the insertion and removal of the bottom and to allow for reasonable warpage of the walls.

I have shown the invention embodied in a pot of rectangular shape, but it may be embodied in round pots and pots of other shapes. The pot is provided with a flared upper edge 13 forming a shoulder 14 to receive the legs of another pot when the pots are stacked one upon the other in an oven and the legs are shaped to seat upon the shoulders in a firm and substantial manner.

In the construction illustrated the pot is provided on opposite walls with outside projections 15 having recesses 16 which are adapted for receiving trunnion supports for the pot, but I may make these projections on the inside of the walls, as set forth in my application Serial No. 225,657 filed concurrently herewith. The walls are provided with outside ribs 17 in the construction illustrated shown as inclined, integral with the outer face of the wall and extending downward from the flared top of the wall and tapering to the bottom of the wall, but I may provide the pot with ribs, as set forth in my co-pending application aforesaid, or in my application Serial No. 222,994 filed September 30, 1927, and I may embody the invention in a corrugated pot, as set forth in my application Serial No. 225,654, filed concurrently herewith and provide it with a compensated radius at curved portions, as set forth in my application Serial No. 222,994. Other changes in the form, construction and arrangement of parts may be made within the scope of the following claims, and I may provide the bottom with ribs on its lower face, as shown in my co-pending application Serial No. 222,994, filed September 30, 1927, or with ribs on its upper face, as shown in my co-pending application Serial No. 225,665, filed concurrently herewith, and these ribs may be provided on both the lower and upper faces of the bottom if desired.

I claim:

1. An annealing pot having walls and an open bottom, legs projecting downwardly from the bottom of said walls, a removable bottom for the pot, and means for supporting the bottom in the pot above the legs.

2. An annealing pot having walls, a plurality of integral legs projecting downwardly from the bottom of said walls, shoulders on said legs projecting inwardly from the inner faces of the walls, and a removable bottom seated on said shoulders within the pot.

3. An annealing pot having walls, a plurality of integral legs projecting downwardly from the bottom of said walls, shoulders on said legs projecting inwardly from the inner faces of the walls, and a removable bottom seated on the shoulders within the pot and having an integral centrally disposed leg.

4. An annealing pot having walls flared at the top thereof, inclined ribs integral with the walls on the outer faces thereof and extending downward from the flared top of the walls and tapering to and merging with the bottom of the walls, and integral trunnion bosses on the outer faces of said walls in the line of and integral with said ribs and having trunnion receiving recesses in their outer ends.

ROBERT S. STEWART.